United States Patent
Helman et al.

(10) Patent No.: US 6,460,451 B1
(45) Date of Patent: Oct. 8, 2002

(54) POPCORN MAKER

(75) Inventors: Andrew Helman, Ventura, CA (US); Gregg Bond, Los Angeles, CA (US)

(73) Assignee: The Helman Group, Ltd., Oxnard, CA (US)

( * ) Notice: Subject to any disclaimer, the term of this patent is extended or adjusted under 35 U.S.C. 154(b) by 0 days.

(21) Appl. No.: 10/133,116

(22) Filed: Apr. 26, 2002

(51) Int. Cl.[7] .............................. A23L 1/00; A23L 1/18
(52) U.S. Cl. ..................... 99/323.5; 99/323.9
(58) Field of Search .................. 99/286, 323.5–323.9, 99/331–334, 337, 338, 473–476, 468, 486, 483; 126/21 A, 369; 34/594, 225, 233; 219/502, 400, 385, 386, 389; 426/231–233, 438, 450, 523; 366/107, 101

(56) References Cited

U.S. PATENT DOCUMENTS

| | | |
|---|---|---|
| 2,922,355 A | 1/1960 | Green |
| 3,294,546 A | 12/1966 | Fingerhut |
| 3,756,139 A * | 9/1973 | Wolens ..................... 99/323.5 |
| 3,812,774 A * | 5/1974 | Day et al. .................. 99/323.8 |
| 4,152,974 A | 5/1979 | Tienor |
| 4,445,427 A | 5/1984 | Kiczek |
| 4,512,247 A | 4/1985 | Friedman |
| 4,702,158 A | 10/1987 | Ishihara |
| 4,727,798 A | 3/1988 | Nakamura |
| 4,748,903 A | 6/1988 | Fereshetian |
| 4,763,568 A | 8/1988 | Kiczek |
| 4,881,457 A | 11/1989 | Lyga et al. |
| 4,895,308 A | 1/1990 | Tanaka |
| 5,033,363 A | 7/1991 | King et al. |
| 5,035,173 A | 7/1991 | Stein et al. |
| 5,083,502 A | 1/1992 | Enomoto |
| 5,154,113 A | 10/1992 | Marquez |
| 5,193,444 A | 3/1993 | Bar-Sheshet |
| 5,263,405 A | 11/1993 | Simon |
| 5,269,072 A | 12/1993 | Walingorski |
| 5,309,825 A | 5/1994 | Pinone |
| 5,419,238 A | 5/1995 | Pinone |
| 5,421,253 A | 6/1995 | Rehmeyer et al. |
| 5,481,962 A | 1/1996 | Tedesco |
| 5,501,139 A | 3/1996 | Lee |
| 5,614,239 A | 3/1997 | Tedesco |
| 5,657,684 A | 8/1997 | Chaikowsky |
| 5,749,288 A | 5/1998 | Skling |
| 5,771,779 A * | 6/1998 | Stein et al. |
| 5,857,403 A | 1/1999 | Mann |
| 6,032,572 A | 3/2000 | Mann |
| 6,135,011 A | 10/2000 | Hodgson et al. |
| 6,187,353 B1 | 2/2001 | Wyman et al. |
| 6,234,063 B1 * | 5/2001 | Evers et al. ............... 99/323.7 |
| 6,374,727 B1 * | 4/2002 | Cretors ...................... 99/323.9 |

* cited by examiner

Primary Examiner—Timothy F. Simone
(74) Attorney, Agent, or Firm—Marvin E. Jacobs

(57) ABSTRACT

A popcorn maker, which utilizes a combination of popping means, and converts corn kernels to popped corn quicker, more efficiently, and with improved taste. The popcorn maker uses a combination of roasting, agitation, heating, and convection to convert the corn kernels into the popcorn, and expel the popcorn out of the popcorn maker. The popcorn maker is easy to use, the corn kernels and the popcorn easily viewable and fun to watch during popping, the popcorn maker producing the popcorn in a quick, convenient, and efficient manner. The popcorn maker discharges the popcorn from a convenient discharge chute into a receptacle of choice, resembles, and has the appearance of an old fashioned popcorn maker. The popcorn maker is free standing, easy to clean and maintain, and of long lasting, durable material. The popcorn maker is light weight, inexpensive, safe to use, attractive, sturdy, of simple construction., and is easy to store.

20 Claims, 8 Drawing Sheets

POPCORN MAKER

BACKGROUND OF THE INVENTION

FIELD OF THE INVENTION

The present invention relates generally to popcorn devices and more particularly to devices for making popcorn, utilizing a combination of popping means.

BACKGROUND ART

Popcorn is typically made by cooking uncooked corn kernels, which expands and bursts the corn kernels into popped corn, the popped corn commonly being called "popcorn." Each of the corn kernels contains a small amount of water stored within a layer of soft starch, the soft starch being surrounded by the corn kernel's outer surface of hard starch, the corn kernel having approximately 13.5 to 14 percent moisture. As heat is applied to the corn kernel, the corn kernel heats up, the water within the corn kernel begins to expand, and pressure builds against the hard starch. Eventually, this hard surface of hard starch gives way, causing the corn kernel to explode. As the corn kernel explodes, the soft starch inside the corn kernel becomes inflated and bursts, turning the corn kernel inside out. The steam created by heating the water inside the kernel is released, and the popcorn is popped, the optimum popping temperature being between 400 and 460 degrees Fahrenheit.

Popcorn devices typically make popcorn, utilizing, what has come to be known as, either "wet" or "dry" popping means. Wet popcorn devices typically use a liquid, such as cooking oil to cook the corn kernels in, and convert the corn kernels into the popped corn, and dry popcorn devices typically use hot air to convert the corn kernels into the popped corn.

Dry popcorn devices have become the preferred choice, because of distinct advantages over wet popping. Dry popping has been shown to be more efficient, requiring less energy, being more efficient, converting the corn kernels to the popped corn quicker, and yielding fewer calories in the same amount of popcorn than wet popped popcorn. Although wet popping allows flavoring to be added during popping of the corn kernels, flavoring may be added after popping the corn kernels into the popcorn in dry popping, if required.

Most dry popcorn poppers immerse the corn kernels in hot air, in order to pop the corn kernels into the popcorn, and although popping the corn kernels in hot air is typically more efficient than wet popping, an improved and more efficient popcorn maker is necessary, which utilizes a combination of popping means, and converts the corn kernels to the popped corn quicker, more efficiently, and with improved taste, compared to conventional dry popping. The popcorn maker should use a combination of roasting, agitation, heating, and convection to convert the corn kernels into the popcorn, and expel the popcorn out of the popcorn maker.

The popcorn maker should be easy to use, the corn kernels and the popcorn easily viewable and fun to watch during popping, the popcorn maker producing the popcorn in a quick, convenient, and efficient manner. The popcorn maker should discharge the popcorn from a convenient discharge chute into a receptacle of choice, resemble, and have the appearance of an old fashioned popcorn maker. The popcorn maker should be free standing, easy to clean and maintain, and be of long lasting, durable material. The popcorn maker should be light weight, inexpensive, safe to use, attractive, sturdy, of simple construction, and easy to store.

Different devices and methods for heating, cooking, and roasting popcorn, coffee, and other food items have heretofore been known. None of these devices or methods adequately satisfies the aforementioned needs.

Different popcorn devices and methods, and in particular hot air or convection popcorn devices and methods, have heretofore been known. However, none of these popcorn devices or methods, and in particular these hot air or convection popcorn devices, adequately satisfies these aforementioned needs.

U.S. Pat. No. 4,702,158 (Ishihara) discloses a popcorn popper having a popping chamber, which has a plurality of radially arranged holes along a bottom periphery, a lower wall portion of gradually smaller diameter, and a bottom having a raised portion. The popcorn popper also has a diffusing device, which directs heated air inward from an outer periphery and upward through the holes in the bottom of the chamber, for more even and efficient heating.

U.S. Pat. No. 4,512,247 (Friedman) discloses a popcorn popping and coating machine, comprising a hot air popcorn popper having a discharge chute in communication with a rotary driven receptacle. The popping and coating machine also has a pivoting gate, which blocks passage of the popcorn through the discharge chute until the popper becomes filled with popped kernels, so that the kernels continue to be heated until the popcorn is introduced into a coating receptacle.

U.S. Pat. No. 5,501,139 (Lee) discloses a popcorn maker having a flap, which closes off a passageway to prevent corn, especially unpopped corn, from reaching a discharge outlet. The flap is balanced in its closed position and is pushed open by any build up of popped corn, to allow the popped corn to be discharged, which then remains open until closed manually.

U.S. Pat. No. 4,152,974 (Tienor) discloses a hot air corn popper having a body, which has a lower body portion closed by a removable cover, a hollow stainless steel popping vessel, which is removably held in the lower body portion, the hollow stainless steel popping vessel having a bottom end closed by a perforated grill, and a gravity flow feed hopper formed in the lower body portion, which provides automatic flow of unpopped kernels into the popping vessel, the unpopped kernels being contained on top of the perforated grill. An upwardly directed hot air flow produced in the lower body portion is directed through the popping vessel. The air flow pops the unpopped kernels and carries the popped kernels out of the popping vessel and the body to a storage receptacle.

U.S. Pat. No. 5,421,253 (Rehmeyer, et al.) discloses a convection oven corn popper and method in which a device is provided to air-pop popcorn in combination with a convection-type oven. The device comprises a spring-mounted bowl to hold corn kernels, and includes a slot in a sidewall for popped popcorn to exit therefrom. The exiting popcorn falls into a cooking chamber of the oven, where the popcorn is held warm until ready to eat.

U.S. Pat. No. 4,445,427 (Kiczek) discloses a popcorn popper, having a receptacle for receiving corn which has been popped and a popping vessel substantially centrally mounted to the receptacle. The popping vessel receives heating oil and kernels of unpopped corn therein, which are heated to a popping temperature to pop the kernels of corn to form popcorn. A deflecting mechanism is provided so as to deflect the corn, which has been popped upward out of the popping vessel into the receptacle, thus, separating the corn that has popped from the kernels of corn in the popping vessel. U.S. Pat. No. 4,763,568 (Kiczek) further discloses a popcorn popper, which utilizes an oil heating mechanism having a pair of heating elements for heating kernels of unpopped corn to form popcorn. The popcorn popper has a base member and a heating mechanism for heating oil and the kernels of unpopped corn to form popcorn. An alternate embodiment of the popcorn popper is disclosed, in which the heating mechanism has an air heating mechanism.

U.S. Pat. No. 3,294,546 (Fingerhut) and U.S. Pat. No. 2,922,355 (Green) disclose devices and method for popping corn, each of the devices having a housing and a popping device, including an air duct, means for blowing gases through and suspending unpopped corn kernels in the popping device, and means for heating the suspended corn kernels.

U.S. Pat. No. 4,727,798 (Nakamura) discloses a popcorn processing machine having a heating chamber into which a measured quantity of raw corn kernels are fed in each of a number of operating cycles. The raw corn kernels are heated, agitated, and popped by hot air supplied under pressure, as a whirling rising vortex, which results in the production of popcorn. The bottom of the heating chamber can be opened, the popcorn dumped, the chamber bottom reclosed, and the operating cycle restarted.

U.S. Pat. No. 4,881,457 (Lyga, et al.) discloses a low-headroom popcorn popper, particularly for under-cabinet mounting. The low-headroom popper has a charging drawer alongside an intermediate chute for feeding kernels of corn into a popping chamber. The corn kernels remain in the charging drawer, until a charging slide is pushed to permit the corn kernels to enter the popping chamber. A horizontal air path between a blower and a plenum, surrounding the popping chamber, further reduces headroom. Air enters the perimeter of the popping chamber from the plenum in a horizontal swirling motion, produced by slanted louvers. A door closes an open bottom of the popping chamber to permit removal of unpopped kernels of corn and other debris therefrom. Heater elements are disposed in the plenum chamber non-uniformly angled about the popping chamber, to attain a substantially uniform air temperature, as heated air enters the popping chamber. Separation of popped corn from unpopped kernels of corn is attained, using two cylindrical sections connected by a diverging conical section. Popped corn rises upward in an air stream, until the rising popped corn passes over a dam, whereupon the popped corn falls down a discharge chute. An electrical control system controls a "wait" light and a "ready," light to indicate to a user the time that an optimum popping temperature exists in the popping chamber. An over temperature sensor deenergizes the heater, blower and the "ready" light, and energizes the "wait" light, when an unsafe temperature is approached.

U.S. Pat. No. 5,033,363 (King, et al.) discloses an automatic, hot air corn popping machine, having a feed conveyor for transporting unpopped corn from a reservoir to a base of a popping tube, which forms part of a popping chamber, and a damper-controlled blower and thermostatically-controlled heater for heating and blowing air to pop corn in the popping chamber. A control circuit is provided with a reprogrammable microcomputer, for programmable operation of the automatic, hot air corn popping machine.

U.S. Pat. No. 5,154,113 (Marquez) discloses a popcorn popping and dispensing apparatus adapted to be used in combination with a hot air source, the apparatus including a popping chamber having a base structured and disposed to be attached to the hot air source and including a centrally disposed opening therethrough to define an air nozzle and allow passage of forced hot air through from the hot air source into an interior of the popping chamber. The popping chamber further includes a top having a neck portion with an open distal end defining a drop chute structured and disposed for passage of popping corn kernels therethrough and into the interior of the popping chamber for exposure to the forced hot air and subsequent popping, and includes a surrounding side wall structure having a discharge chute attached to and extending angularly downward from an upper portion thereof, so as to allow passage of popped popcorn therethrough and out from an open end thereof, and a cleaning chute attached to and extending angularly upward from a lower portion thereof, so as to facilitate the insertion of cleaning instruments therethrough and into the interior of the popping chamber for cleaning thereof.

U.S. Pat. No. 3,756,139 (Wolens) discloses a device for popping corn, having a receptacle for receiving popped corn and a popping vessel arranged in the receptacle for receiving kernels of popcorn. A hot air blower charges a stream of hot air downward into the popping vessel, and heats kernels of popcorn to a popping temperature. The stream of air drives the popped corn out to the popping vessel and into the receptacle, to separate the popped corn from the unpopped kernels of popped corn.

U.S. Pat. No. 5,263,405 (Simon) discloses a hot air corn popping machine, for supplying popped corn which may be used as packaging material. Unpopped kernels are fed into a hopper and through a motorized feed unit and sensor switch, which provide controlled amounts of kernels into a popping chamber within a heating chamber. A blower motor provides pressurized air through heating coils around the popping chamber, to pop the corn and direct the popped corn through an exhaust system. A ramp having a grating at the lower end separates unpopped kernels, which are collected for recycling. The popped corn is blown upward through an exhaust tube, for collection by an external collector.

Different popcorn vending machines have heretofore been known. However, none of these popcorn vending machines adequately satisfies these aforementioned needs.

U.S. Pat. Nos. 5,419,238 (Pinone) and 5,309,825 each disclose a popcorn machine for measuring a metered amount of popcorn, cooking the popcorn fresh, and dispensing the freshly cooked popcorn into a manually positioned cup in a front portion of the popcorn machine.

U.S. Pat. No. 5,657,684 (Chaikowsky) discloses a popcorn vending machine having a corn dispenser for dispensing a measured quantity of corn to a cooker assembly, the cooker assembly for cooking the corn kernels and dispensing the cooked corn kernels to a cup in an area accessible by a purchaser.

U.S. Pat. No. 6,187,353 (Wyman, et al.) discloses a hot air popcorn machine having a programmable control system for controlling various operating parameters, including air flow and air temperature, to enable the popcorn machine to produce popcorn in a substantially low maintenance environment, such as a free-standing vending machine.

Different automatic popcorn machines have heretofore been known. However, none of these automatic popcorn machines adequately satisfies these aforementioned needs.

U.S. Pat. No. 6,135,011 (Hodgson, et al.) discloses an automated batch popcorn machine, having a tiltable kettle actuated by a motor drive controlled to operate in a single batch and automatic dump process. U.S. Pat. No. 5,771,779 (Stein, et al.) discloses an automated corn popping apparatus having a kettle assembly, a support arrangement for supporting and operating the kettle assembly, a display arrangement for enclosing the corn popping apparatus, and control means for automatically operating the corn popping apparatus. U.S. Pat. No. 5,035,173 (Stein, et al.) discloses an apparatus for the automatic, continuous popping of popcorn having an upper storage compartment, heating coils for providing heat inside the upper storage compartment, a popcorn popping kettle, a lower storage compartment housing electrical components, a corn supply, a salt supply and an oil supply.

Different corn popping apparatus having kettles have heretofore been known. However, none of these corn popping apparatus having kettles adequately satisfies these aforementioned needs.

U.S. Pat. Nos. 6,032,572 (Mann) and 5,857,403 (Mann) each disclose corn popping apparatus comprising a box-like cabinet with a tiltable lid, having a large metal popping kettle attached thereto, which when lowered, the bottom of the kettle projects downwardly into the cabinet interior through a panel covering the top of the cabinet, the kettle being heated to popping temperature by a fuel burner inside the cabinet.

Different apparatus and methods for heating, cooking and roasting food have heretofore been known. However, none of these apparatus or methods adequately satisfies these aforementioned needs.

U.S. Pat. No. 5,193,444 (Bar-Sheshet) discloses a forced air oven for and a method of heating, cooking or roasting granular food, such as nuts, seeds and coffee beans. The apparatus houses a hollow cylindrical drum into which food is placed. A heated gaseous stream is forced through the inside of the drum with sufficient force to blow the food away from the inside surface of the drum. Perforations in the drum are positioned such that the heated gaseous stream blows the food toward a rear end of the drum, and causes the food to churn, which allows the heated air to envelope the outside surface of the food and provides even transmission of heat to the food. The drum is provided with a helical fin that pushes the food toward a front end of the drum. A wire mesh is also provided for collecting particles that are dislodged from the food, and an exhaust system is provided for venting the gasses created during the heating, cooking or roasting of food. The oven is equipped with a door that has feed and discharge gates for inserting and removing the food, without opening the door.

U.S. Pat. No. 5,481,962 (Tedesco) discloses a countertop puffing oven for pelletized foodstuffs, having a pellet-receiving container, including an air flow-directing agitator mounted in the bottom thereof and cooperating with a forced inflow of air initially introduced through a heater element preheated to at least approximately 375 degrees Fahrenheit for intimate substantially unencumbered contact of substantially the entire surface area of each pellet with the hot air.

U.S. Pat. No. 5,614,239 (Tedesco) further discloses a method of puffing pelletized foodstuffs in which foodstuff pellets are puffed by radiantly heating the pellets in a chamber to cause a rapid rise in the chamber temperature to a temperature sufficient for puffing, and once this temperature has been reached, a fluidizing flow of air is created and maintained within the chamber to agitate, move and suspend the pellets within the chamber while maintaining the puffing temperature causing uniform puffing of the pellets. After the pellets are puffed, the radiant heating is discontinued while the fluidizing flow of air continues to cool the puffed pellets.

U.S. Pat. No. 4,748,903 (Fereshetian) discloses a combination oven and popcorn popper unit, which may be used to cook or heat food items and to pop popcorn kernels. A lower oven section has internal walls defining a food-receiving compartment, and a food supporting member is located in the compartment for supporting food items to be cooked or heated. A container above the oven section is provided for receiving kernels of corn to be popped, and heating means is provided below the food supporting means for providing heat for the oven section and also for heating the kernels of corn in the container, during use of the device as a popcorn popper. Deflector means communicate with the container for deflecting popped kernels of corn along a predetermined path of travel out of the unit.

Different coffee roasters have heretofore been known. However, none of the coffee roasters adequately satisfies these aforementioned needs.

U.S. Pat. No. 5,269,072 (Waligorski) discloses a coffee roaster for roasting a selected volume of coffee beans, having a roasting cavity for receiving and roasting a selected volume of green coffee beans, a timer for controlling the roasting time, and a heating coil for generating heat to roast the coffee beans. A motor drives a fan, which forces air through the heating coil and toward the roasting cavity. Slots defined by the roasting cavity direct the heated air into the roasting cavity, such that the coffee beans are agitated and roasted. The roasting cavity has an opening in the top of the roasting cavity. Chaff is evacuated with the air through the opening in the top of the roasting cavity. A chaff collector is provided for collecting the chaff evacuated, while allowing the escape of air.

U.S. Pat. No. 5,749,288 (Skaling) discloses a coffee bean roaster for home use, in which a fan heater assembly in housing blows hot air upwardly through a glass roasting chamber. The hot air escaping from the top of the chamber may be selectively recycled into the housing to raise the roasting temperature to compensate for low levels in available electrical power.

U.S. Pat. No. 4,895,308 (Tanaka) discloses a coffee maker, having a roasting portion, which heats raw coffee beans placed therein, so as to roast the raw coffee beans, a grinding portion, which grinds the roasted coffee beans which have been roasted in the roasting portion, a transferring portion, which is connected between the roasting portion and the grinding portion and automatically transfers the roasted coffee beans from the roasting portion to the grinding portion after the raw coffee beans have been roasted, and an extracting portion, which extracts the coffee from the ground coffee beans loaded therein from the grinding portion.

U.S. Pat. No. 5,083,502 (Enomoto) discloses a coffee making machine for automatically producing coffee solution from unroasted coffee beans having a roaster for holding coffee beans and roasting the dried coffee beans into roasted coffee beans, a milling/extracting unit for grinding the roasted coffee beans into ground coffee and extracting coffee solution from the ground coffee, a blower for blowing air into the milling/extracting unit to cool the roasted coffee beans before the roasted coffee beans are ground, a pouring unit for pouring hot water onto the ground coffee and extracting the coffee solution therefrom, a coffee server for receiving the coffee solution from the milling/extracting unit, and means for supplying the coffee solution from the milling/extracting unit to the coffee server.

For the foregoing reasons, there is a need for an improved and more efficient popcorn maker, which utilizes a combination of popping means, and converts the corn kernels to the popped corn quicker, more efficiently, and with improved taste, compared to conventional dry popping. The popcorn maker should use a combination of roasting, agitation, heating, and convection to convert the corn kernels into the popcorn, and expel the popcorn out of the popcorn maker.

The popcorn maker should be easy to use, the corn kernels and the popcorn easily viewable and fun to watch during popping, the popcorn maker producing the popcorn in a quick, convenient, and efficient manner. The popcorn maker should discharge the popcorn from a convenient discharge chute into a receptacle of choice, resemble, and have the appearance of an old fashioned popcorn maker. The popcorn maker should be free standing, easy to clean and maintain, and be of long lasting, durable material. The popcorn maker should be light weight, inexpensive, safe to use, attractive, sturdy, of simple construction, and easy to store.

SUMMARY OF THE INVENTION

The present invention is directed to a popcorn maker, which utilizes a combination of popping means, and converts the corn kernels to the popped corn quicker, more efficiently, and with improved taste, compared to conventional dry popping. The popcorn maker uses a combination of roasting, agitation, heating, and convection to convert the corn kernels into the popcorn, and expel the popcorn out of the popcorn maker. The popcorn maker is easy to use, the corn kernels and the popcorn easily viewable and fun to watch during popping, the popcorn maker producing the popcorn in a quick, convenient, and efficient manner. The popcorn maker discharges the popcorn from a convenient discharge chute into a receptacle of choice, resembles, and has the appearance of an old fashioned popcorn maker. The popcorn maker is free standing, easy to clean and maintain, and of long lasting, durable material. The popcorn maker is light weight, inexpensive, safe to use, attractive, sturdy, of simple construction., and easy to store.

A popcorn maker having features of the present invention comprises: a combination heater, roaster, agitator, and convection unit, the combination heater, roaster, agitator, and convection unit having a heater, roaster agitator, chimney, and blower; the roaster agitator being substantially cup shaped, having a bottom and a substantially cylindrical wall having a plurality of louvers therein, the louvers disposed so as to direct heated air downward and towards a central portion of the bottom of the roaster agitator; the blower drawing air thereinto the popcorn maker, and impelling the air therethrough the heater; the heater heating the air and generating heated air; the blower impelling the heated air therethrough the louvers and thereinto the roaster agitator; the heated and impelled air roasting and agitating corn kernels therein the roaster agitator, the roasted and agitated corn kernels being converted to popcorn; the heated and impelled air impelling the popcorn thereinto the chimney and expelling the popcorn thereout of the chimney; a base; and a removably mating cover, the removably mating cover mating with the base; the removably mating cover having a chute; the combination heater, roaster, agitator, and convection unit mounted therein the base and extending thereinto the removably mating cover; the popcorn expelled thereout of the chimney thereinto the removably mating cover and thereout of the chute.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Figures 1, 7:
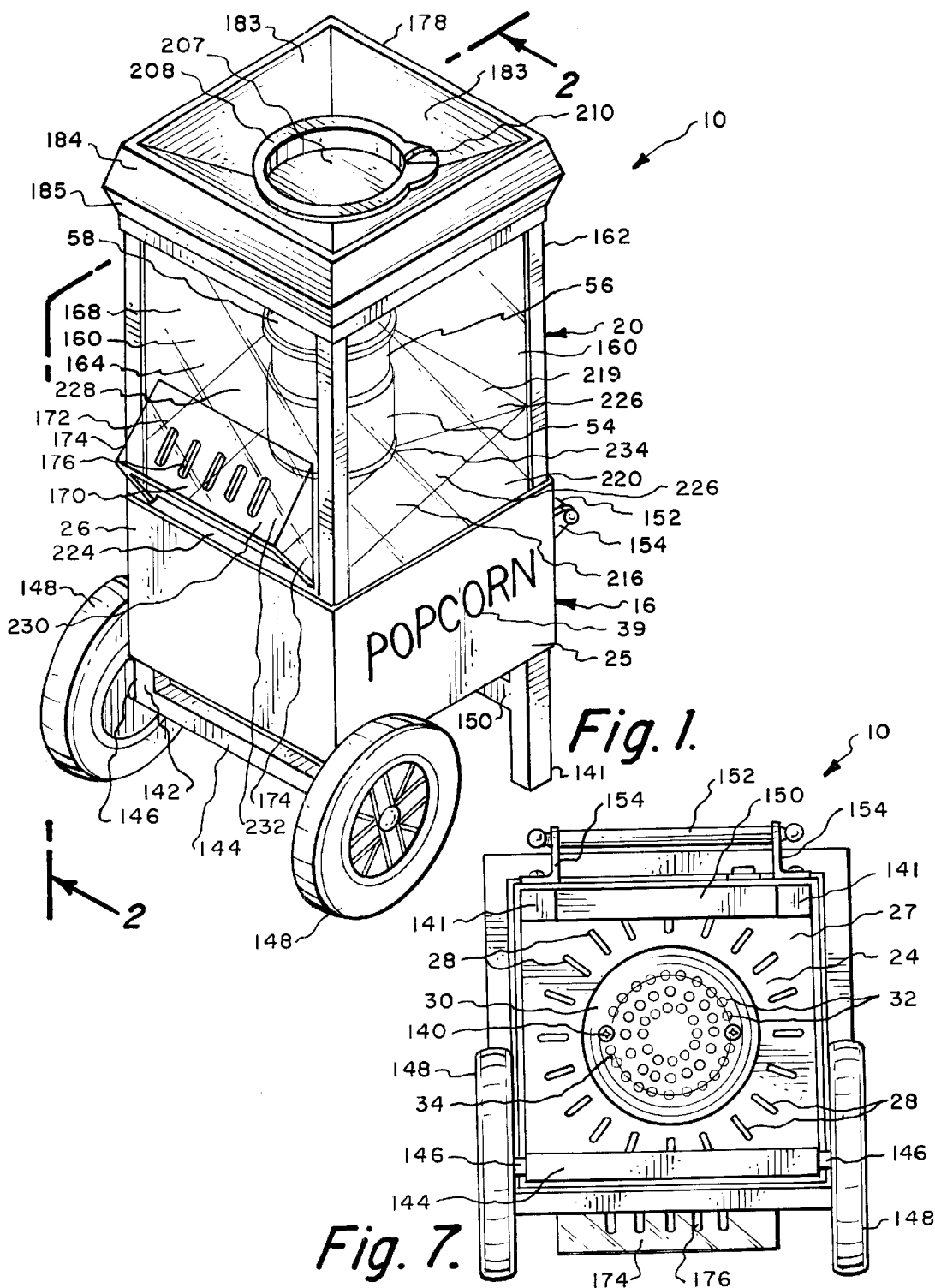
FIG. 1 is a perspective view of a popcorn maker, constructed in accordance with the present invention.
FIG. 7 is a bottom view of the popcorn maker of FIG. 1.
Figure 2:
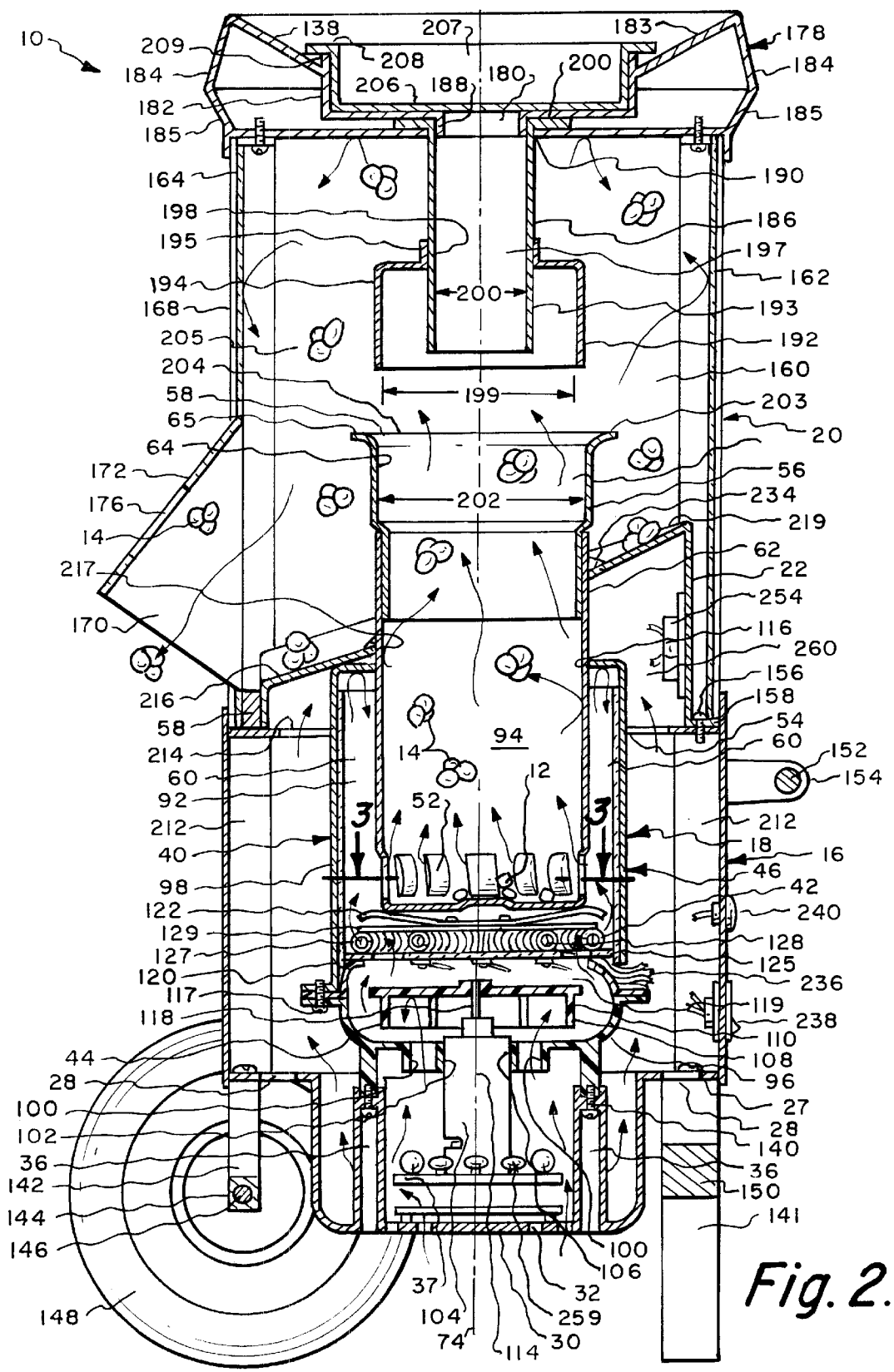
FIG. 2 is a side section view of the popcorn maker of FIG. 1.
Figure 3:
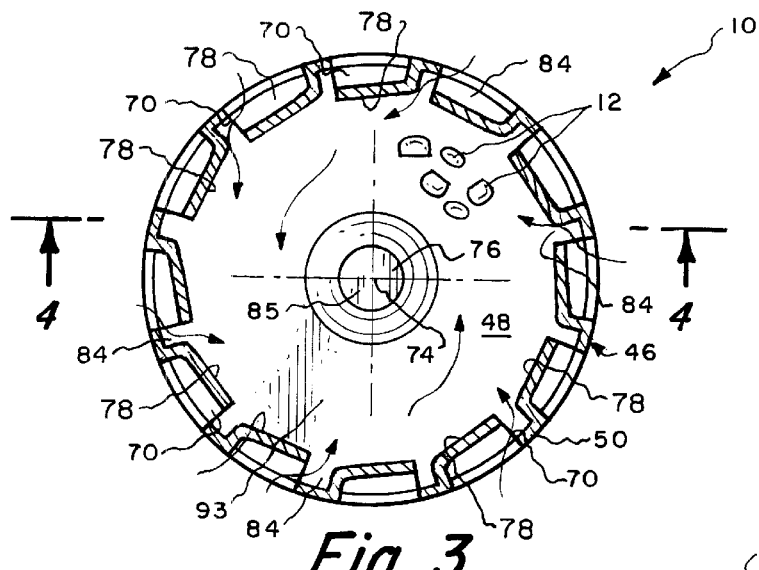
FIG. 3 is a top section view of a roaster agitator of the popcorn maker of FIG. 1.
Figure 4:
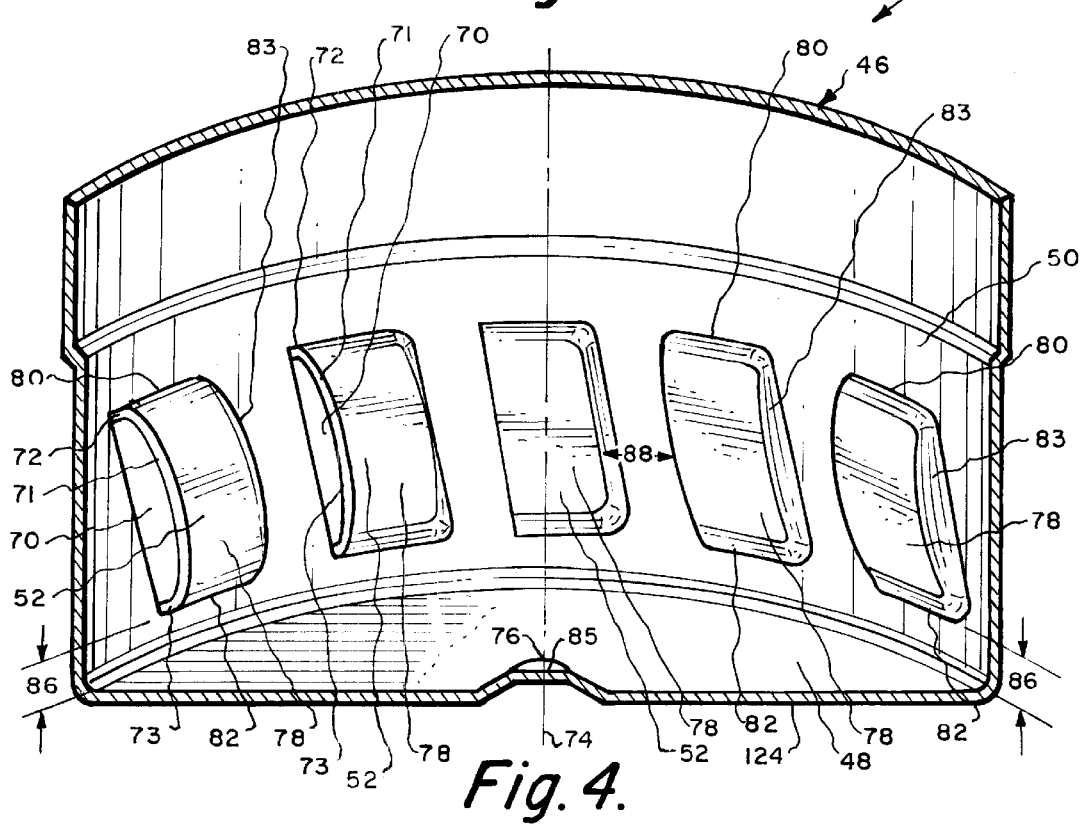
FIG. 4 is a side section view of the roaster agitator of the popcorn maker of FIG. 1.
Figure 5:
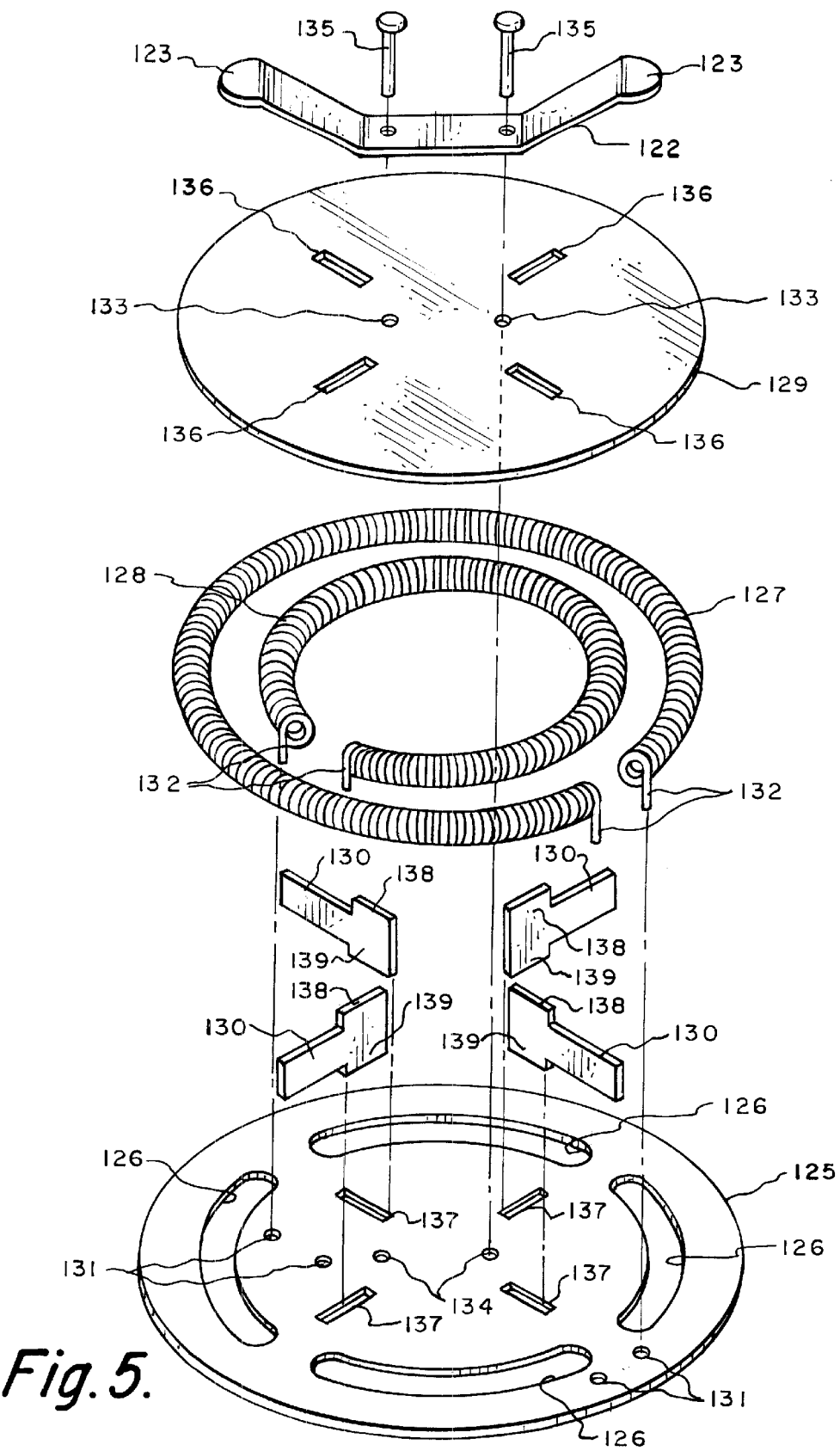
FIG. 5 is an exploded view of a heater of the popcorn maker of FIG. 1.
Figure 6:
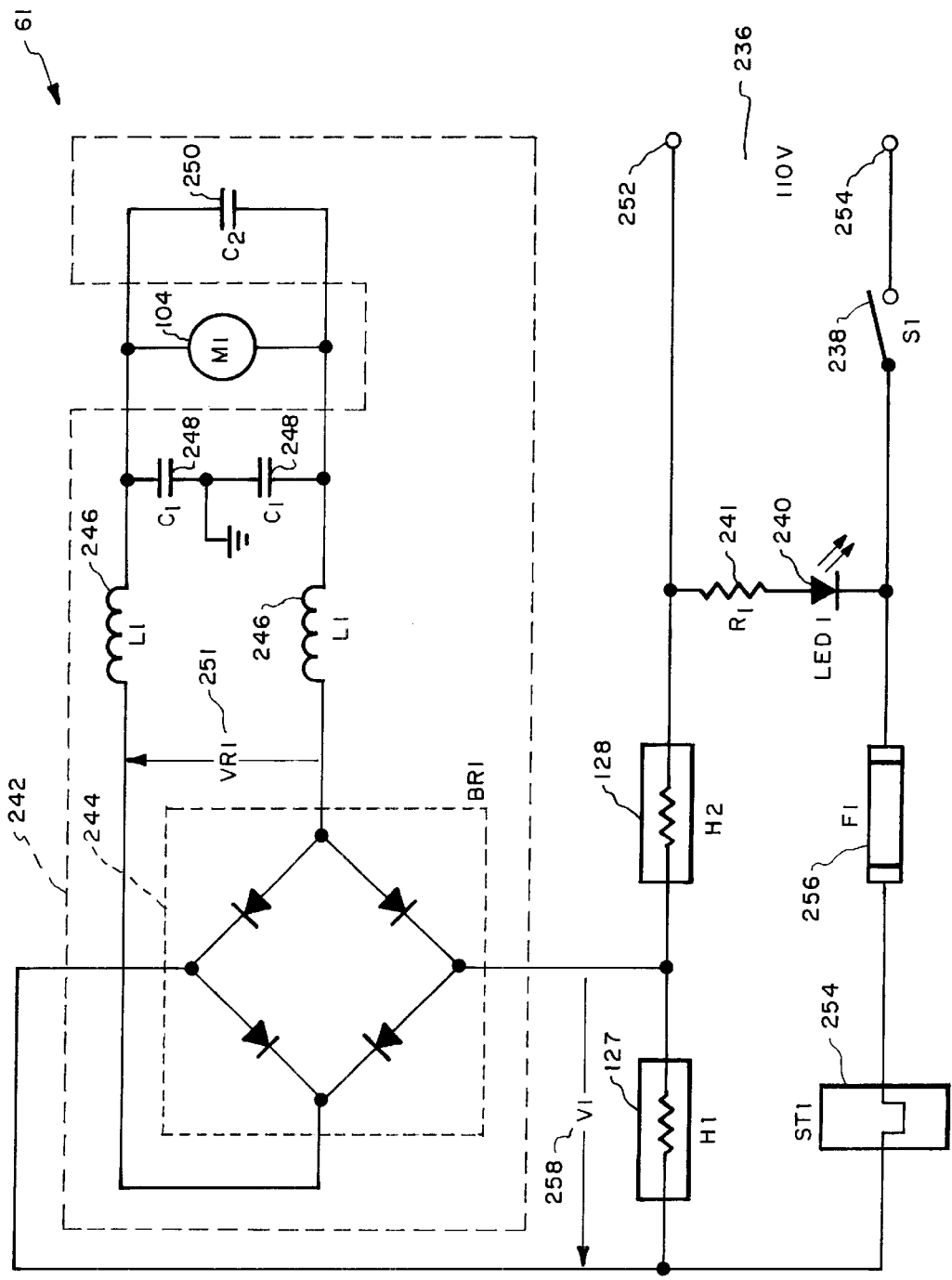
FIG. 6 is schematic diagram of an electronic circuit of the popcorn maker of FIG. 1.

The preferred embodiments of the present invention will be described with reference to FIGS. 1–13 of the drawings. Identical elements in the various figures are identified with the same reference numbers.

FIGS. 1–7 show an embodiment of the present invention, a popcorn maker 10 for roasting and popping corn kernels 12 into popped corn 14, hereinafter also called popcorn 14. The corn kernels 12 are typically popped into the popcorn 14 at the optimum popping temperature, which is between 400 and 460 degrees Fahrenheit. The popcorn maker 10 has base housing 16 having combination heater, roaster, agitator, and convection unit 18 substantially centrally located coaxially therein the base housing 16, and removably replaceable mating cover 20. The corn kernels 12 are converted to the popcorn 14 by a combination of roasting, agitation, heat transfer, and convection therein the combination heater, roaster, agitator, and convection unit 18, and expelled therefrom the popcorn maker 10 by convection and gravity.

The base housing 16 has upper base 22 and lower base mount 24, the upper base 22 being preferably substantially cuboid shaped or substantially rectangular parallelepiped shaped, having walls 25 and 26, and the lower base mount 24 being preferably substantially cylindrically shaped, although the upper base 22 and the lower base mount 24 may have other suitable shapes. Bottom 27 of the upper base 22 has a plurality of substantially oblong holes 28 radially disposed therein, and bottom 30 of the lower base mount 24 has a plurality of substantially circular holes 32 radially disposed in a pattern of concentric rings 34 therein and thereabout the lower base mount 24. The lower base mount 24 has support members 36 for supporting and affixing the combination heater, roaster, agitator, and convection unit 18 thereto, and combination air regulator and diverter 37 substantially centrally located adjacent the bottom 30 of the lower base mount 24, which regulates and diverts interior air 38 initially entering the popcorn machine 10. The walls 25 and 26 of the upper base 22 may have optional advertising, graphics, or indicia 39 thereon.

The combination heater, roaster, agitator, and convection unit 18 has heater housing 40, heater 42, blower 44, roaster agitator 46, which is cup shaped and has bottom 48 and wall 50 having a plurality of louvers 52 thereabout, chimney 54, chimney top 56, having flared top opening 58, heat transfer chamber 60, and electronic circuit 61.

The roaster agitator 46, the chimney 54, and the chimney top 56 are substantially coaxial one with the other, each being substantially cylindrically shaped. The roaster agitator 46 and the chimney 54 are preferably of unitary construction, the chimney 54 extending from the roaster agitator 46, although the chimney 54 and the roaster agitator 46 may alternatively be constructed separately, and affixed one to the other. The chimney top 56 has lower section 62, top section 64, flared top 65, and the flared top opening 58, the lower section 62 typically being inserted and press fit thereinto the chimney 54, with the top section 64 of the chimney top 56 extending above the chimney Each of the louvers 52 thereabout the wall 50 of the roaster agitator 46 has slot 70 therein, arcuate edge 71, and edges 72 and 73, the slot 70 being defined by the wall 50, the arcuate edge 71, and the edges 72 and 73. The arcuate edge 71 extends away from the wall 50 and radially inward toward centerline 74, the centerline 74 being common to the roaster agitator 46, the chimney 54, the chimney top 56, and the heater housing 40. Each of the louvers 52 has an arcuate shaped roof 78 and walls 80, 82, and 83 adjoined thereto the wall 50, respectively. The louvers 52 are disposed so as to direct hot air 84 exiting therefrom the slots 70 toward center 76 of the roaster agitator 46, the center of the roaster agitator 46 having upwardly disposed closed nipple 85. Each of the louvers 52 are elevated substantially the same height 86 above the roaster agitator 46. Each of the arcuate edges 71 of each of the louvers 52 are spaced substantially the same distance 88 from the closest adjacent one of the walls 83 of the adjacent louver Now in more detail, each of the slots 70 and the arcuate shaped roof 78 adjacent a neighboring one of the slots 70 act in conjunction one with the other to direct the hot air 84 exiting therefrom the slots 70 toward the center 76 of the roaster agitator 46. The hot air 84 exiting therefrom each of the slots 70 is directed toward the center 76 of the roaster agitator 46 and toward the wall 83 adjacent the neighboring one of the slots 70, the arcuate shaped roof 78 of the adjacent one of the louver 52 further diverting the hot air 84 toward the center 76 of the roaster agitator 46. The hot air 84 circulates cyclonically inwardly, so as to roast, circulate, and agitate the corn kernels 12 about the center of the roaster agitator 46 and the upwardly disposed closed nipple 85, which aids in creating an updraft of the popcorn 14, upon the corn kernels 12 having changed state to the popped corn 14.

Additional heat is transferred therethrough the bottom 48 and the wall 50 of the roaster agitator 46 and wall 90 at lower portion 92 of the chimney 54 therefrom the heat transfer chamber 60, the bottom 48, the wall 50, and the wall 90 acting as a heat exchanger, transferring heat from the heat transfer chamber 60 to interior 93 of the roaster agitator 46 and lower interior portion 94 of the chimney 54.

The heater housing 40 has base 96 and top 98. The base 96 of the heater housing 40 has a plurality of air inlet holes 100 and a blower motor receiving hole 102. The blower 44 has blower motor M1 (104) affixed thereto edges 106 of the blower motor receiving hole 102, the blower motor M1 (104) being coaxially mounted therein the base 96 of the heater housing 40. The blower 44 has impeller 108 having a plurality of impeller blades 110, the impeller 108 being affixed to shaft 112 of the blower motor M1 (104) at centerline 114 of the impeller 108, which is substantially common to the centerline 74.

The top 98 of the heater housing 40 has substantially cylindrical chimney receiving hole 116, the chimney 54 matingly extending therethrough the chimney receiving hole 116. The top 98 of the heater housing 40 is fastened thereto the base 96 of the heater housing 40, with screws 117 or other suitable fasteners. The base 96 of the heater housing 40 has side portion 118 extending up and thereinto bottom interior 119 of the base 96 and lip 120 having the heater 42 mounted thereupon, the lip 120 extending inwardly toward the centerline 74.

The heater 42 has compression spring 122 affixed thereto, having leaves 123 abutting bottom exterior 124 of the roaster agitator 46, the compression spring 122, acting in compression, forcing the heater 42 abuttingly against the lip 120, holding the heater 42 in place, and transferring additional heat therefrom the heater 42 thereto the roaster agitator 46. The heater 42 has lower disk 125 having a plurality of arcuate shaped air intake holes 126, heater elements H1 (127) and H2 (128), upper disk 129, and separators 130, separating the upper disk 129 from the lower disk 125, the heater elements H1 (127) and H2 (128) sandwiched therebetween the upper disk 129 and the lower disk 125. The lower disk 125 also has holes 131, cable ends 132 of the heater elements H1 (127) and H2 (128) being directed therethrough to the electronic circuit 61, which power to drive the heater elements H1 (127) and H2 (128) is controlled therefrom. The upper disk 129 and the lower disk 125 also have holes 133 and 134, respectively, for mounting fasteners 135 therethrough, which hold the upper disk 129 and the lower disk 125 fastened one to the other and the compression spring 122 fastened to the upper disk 129. The upper disk 129 and the lower disk 125 also have holes 136 and 137, respectively, for accepting tabs 138 and 139 of the separators 130 therethrough, respectively, and holding the separators 130 in place therebetween the upper disk 129 and the lower disk 125.

The combination heater, roaster, agitator, and convection unit 18 is mounted thereto the support members 36 of the lower base mount 24, with appropriate fasteners, such as screws 140, or other suitable fasteners.

The upper base 22 has support legs 141 affixed thereto, and legs 142 having axle support member 144, the axle support member 144 affixed thereto and therebetween the legs 142. The axle support member 144 has axle 146 therethrough, the axle 146 having wheels 148 affixed thereto. The support legs 141 have support member 150 affixed thereto and therebetween the support legs 141. The support legs 141 and the wheels 148 are adapted to support the popcorn maker 10 on a variety of surfaces. The upper base 22 also has handle 152, which may be used to push or pull the popcorn maker 10 about the surfaces, the handle 152 affixed to handle supports 154, which are affixed to the upper base 22. The upper base 22 has receiving groove 156 about upper interior edge 158 of the upper base 22, for matingly receiving the removably replaceable mating cover 20.

The removably replaceable mating cover 20 is preferably four sided, having two opposing substantially rectangular sides 160, a substantially rectangular back side 162, and front chute side 164 opposing the back side 162. The front chute side 164 has substantially rectangular portion 168 and chute 170, adapted to expel the popped corn 14 from the popcorn maker 10, when the removably replaceable mating cover 20 is matingly placed atop the upper base 22, and the popcorn maker 10 is operating to make the popcorn 14. The sides 160, the rectangular back side 162, and the front chute side 164 are preferably of transparent or semi transparent material, to facilitate observing roasting and popping the corn kernels 12 into the popped corn 14, but other suitable materials may also be used. The sides 160, the rectangular back side 162, and the front chute side 164 may have optional advertising, graphics, or indicia thereon.

The chute 170 has a substantially rectangular face 172 and substantially triangular opposing sides 174, the face 172 being angularly disposed to deflect the popcorn 14 being expelled therefrom the popcorn maker 10 in a downward direction and into a dish or other collection or receiving implement that may optionally be placed underneath the chute 170, or a surface beneath the chute 170. The face 172 has substantially oblong holes 176 therein, for venting excess heat from the popcorn maker 10.

The removably replaceable mating cover 20 has top 178, which has substantially centrally located hole 180, substantially cylindrical dish holder 182 concentrically located about the hole 180, inwardly and downwardly sloping top portions 183, and outwardly and inwardly sloping top edges 184 and 185, respectively. The removably replaceable mating cover 20 has cylinder 186 affixed thereto edge 188 of the hole 180, at top 190 of the cylinder 186, and inverted chimney deflector 192 coaxially mounted thereto base 193 of the cylinder 186. The inverted chimney deflector 192 has inverted cylindrically shaped cup 194, mounting ring 195, and top deflector 196. The mounting ring 195 is affixed to the top deflector 196, the top deflector 196 and the mounting ring 195 having centrally located hole 197 therethrough, edges 198 of the mounting ring 195 affixed thereto the base 193 of the cylinder 186.

The inverted cylindrically shaped cup 194 of the inverted chimney deflector 192 has a diameter 199 larger than diameter 200 of the cylinder 186, the diameter 199 of the inverted chimney deflector 192 being smaller than diameter 202 of the chimney top 56. The diameter 199 of the inverted chimney deflector 192, the diameter 202 of the chimney top 56, curvature 203 of flared portion 204 of the chimney top 56, and the associated flared top opening 58, and relationship one to the other, are adapted to expel the popcorn 14 therefrom the chimney top 56, about exterior 205 of the inverted chimney deflector 192, deflect the corn kernels 12 back into interior 206 of the chimney top 56, and deflect a portion of heat emanating therefrom the chimney top 56 back into the chimney top 56 and the chimney 54.

Measuring dish 207 is removably retained in the cylindrical dish holder 182, during operation of the popcorn maker 10 and at other times, and is used to measure an amount of the corn kernels 12 to be loaded into the popcorn maker 10 therethrough the hole 180. The measuring dish 207 has lip 208, adapted to rest on edges 209 of the dish holder 182, and handle 210 to facilitate lifting and maneuvering the measuring dish 207. A measured amount of the corn kernels 12 are poured thereinto the hole 180 for popping.

The upper base 22 of the base housing 16 has internal supports 212 for supporting plate 214 having centrally located hole 215, the top 98 of the heater housing 40 matingly fitting therethrough. The base housing 16 has disposal tray 216 downwardly sloping toward the chute 170, for disposing the popcorn 14 therefrom to a collection or receiving implement that may optionally be placed underneath the chute 170, or a surface beneath the chute 170. The disposal tray 216 is affixed to the internal supports 212, and has hole 217 having edge 218, sloping top 219, sloping sides 220, back side 222, and front edge 224. The sloping top 219 has top portion 226, side portions 228, and central portion 230, the top portion 226 and the side portions 228 sloping downwardly toward the central portion 230, forming a trough 232 directed toward the front edge 224 and the chute 170, for disposal of the popcorn 14 therefrom. The chimney 54 is upwardly disposed therethrough the hole 217 of the disposal tray 216, the chimney 54 having seal 234 thereabout and adjacent thereto, the seal 234 also being and interior and adjacent the edge 218 of the hole 217 of the disposal tray 216.

The blower motor M1 (104), the heater elements H1 (127) and H2 (128), and the electronic circuit 61 are powered by power line 236, which is typically 110 volt line voltage, although other suitable voltages and power sources may be used. Switch S1 (238) allows current to flow, when the switch S1 (238) is closed, which places indicator light LED1 (240) and series limiting resistor R1 (241) in parallel with the power line 236, and the indicator light LED1 (240), which is a emitting diode, lights up, indicating that power is being supplied to the popcorn maker 10. The electronic circuit 61 has power supply PS (242), which supplies direct current to the blower motor M1 (104).

The power supply PS (242) has bridge rectifier BR1 (244), and power supply chokes L1 (246), filter capacitors C1 (248), and filter capacitor C2 (250), which smooth rectified output VR1 (251) from the bridge rectifier BR1 (244), and supply direct current to the blower motor M1 (104), the filter capacitors C1 (248) and the filter capacitor C2 (250) also acting as a motor capacitor. The heater elements H1 (127) and H2 (128) are in series with line input 252 of the power line 236, thermal breaker switch ST1 (254), fuse F1 (256), and the switch S1 (238), which are in series with line input 254 of the power line 236. Input V1 (258) to the bridge rectifier BR1 (244) is in parallel with the heater element H1 (127). The heater elements H1 (127) and H2 (128) being in series, each 10 having resistance, act as a voltage divider, which supplies a portion of power line 236 voltage across the heater element at the input V1 (258) of the bridge rectifier BR1 (244). The power supply PS (242), the fuse F1 (256), and the limiting resistor R1 (241) of the electronic circuit 61 are mounted on circuit board 259.

The heat supplied by the heater elements are determined by the resistances of the heater elements H1 (127) and H2 (128), the voltages applied thereto and the current allowed to flow therethrough. The quantity of air supplied to the popcorn maker 10 is dependent upon the voltage supplied to the blower motor M1 (104), the current allowed to flow therethrough, and the impeller 108 of the blower 44. The blower motor M1 (104), the current allowed to flow therethrough, the impeller 108 of the blower 44, and the resistances of the heater elements H1 (127) and H2 (128) are, thus, adapted to supply a suitable amount of heat and air therethrough the popcorn maker 10.

The thermal breaker switch ST1 (254) is mounted at interior 260 of the back side 222 of the disposal tray 216, which opens, and switches power to the popcorn maker 10 off, when an excessive predetermined temperature is reached. The thermal breaker switch ST1 (254) closes again after the temperature drops to an acceptable value, and preferably after a predetermined time period at an acceptable value, allowing the popcorn maker 10 to be used again, although a suitable thermostat may alternatively be used. The fuse F1 (256) opens and switches power to the popcorn maker 10 off, if excessive current is drawn by the popcorn maker 10.

The popcorn maker 10 may be of metal, such as aluminum or steel, thermoplastics, thermosetting polymers, rubber, or other suitable material or combination thereof. The heater housing 40 of the combination heater, roaster, agitator, and convection unit 18 is preferably of thermoplastics or thermosetting polymers, or other suitable material or combination thereof. The roaster agitator 46, the chimney 54, and the chimney top 56 of the combination heater, roaster, agitator, and convection unit 18, are preferably of aluminum, steel, metal, or other suitable material or combination thereof. The base 96 of the heater housing 40 is preferably of thermoplastics or thermosetting polymers, and the sides 160, the rectangular back side 162, and the front chute side 164 are preferably of transparent or semi transparent thermoplastics or thermosetting polymers, or other suitable material or combination thereof.

Figure 8:
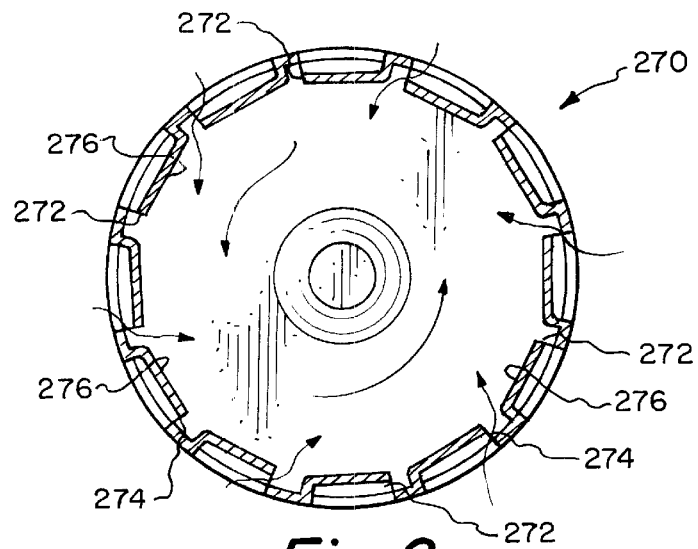
FIG. 8 is a top section view of an alternate roaster agitator.
Figure 9:
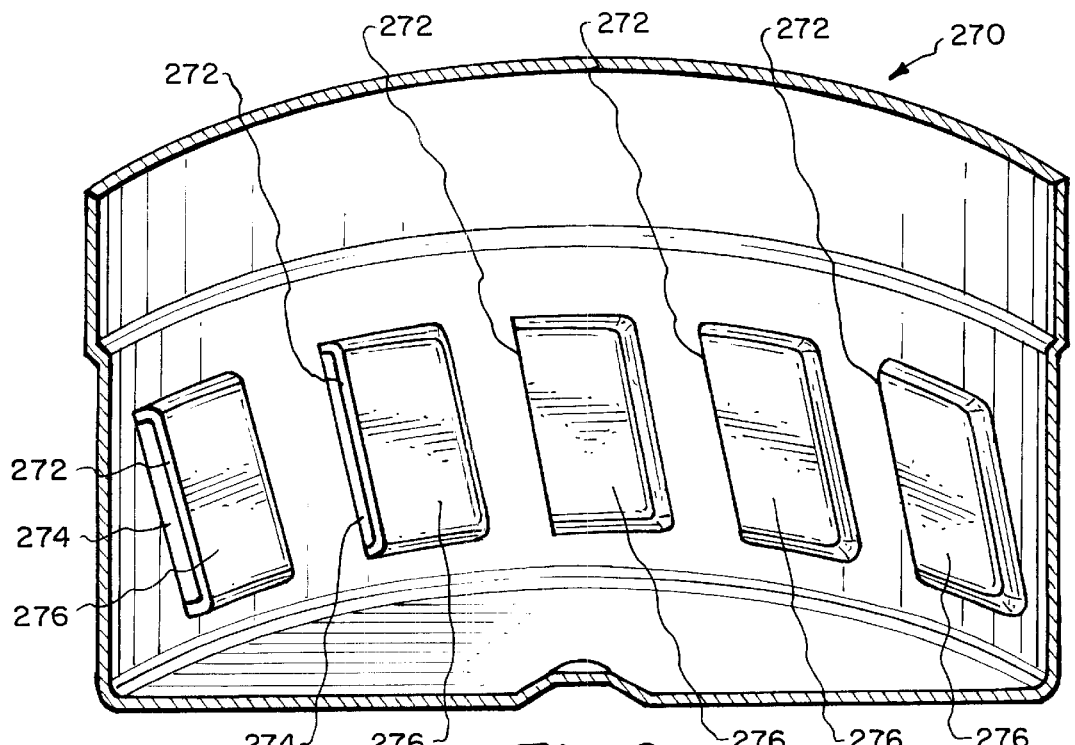
FIG. 9 is a side section view of the alternate roaster agitator of FIG. 8.

FIGS. 8 and 9 show an alternate roaster agitator 270 that may be used with the popcorn maker 10, although the roaster agitator 46 is preferred, the roaster agitator 46 having improved performance. A primary difference between the roaster agitator 46 and the roaster agitator 270 is that: each of the louvers 52 thereabout the wall 50 of the roaster agitator 46 have the slot 70 therein, the arcuate edge 71, and the edges 72 and 73, the slot 70 being defined by the wall 50, the arcuate edge 71, and the edges 72 and 73, and the arcuate shaped roof 78; whereas each louver 272 of the roaster agitator 270 has a substantially rectangular slot 274 and a substantially planar roof 276. The arcuate edge 71 of the slot 70 and the arcuate shaped roof 78 of each of the louvers 52 of the roaster agitator 46 result in improved performance over the roaster agitator 270 having the substantially rectangular slot 274 and the substantially planar roof 276.

Figure 10:
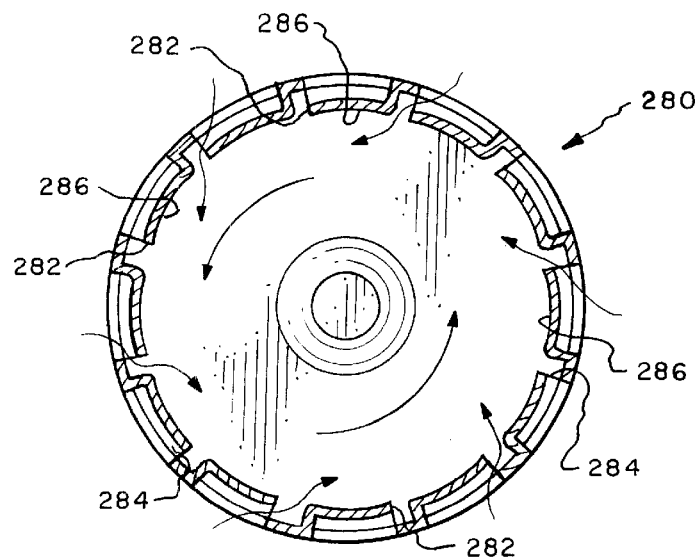
FIG. 10 is a top section view of an alternate roaster agitator.
Figure 11:
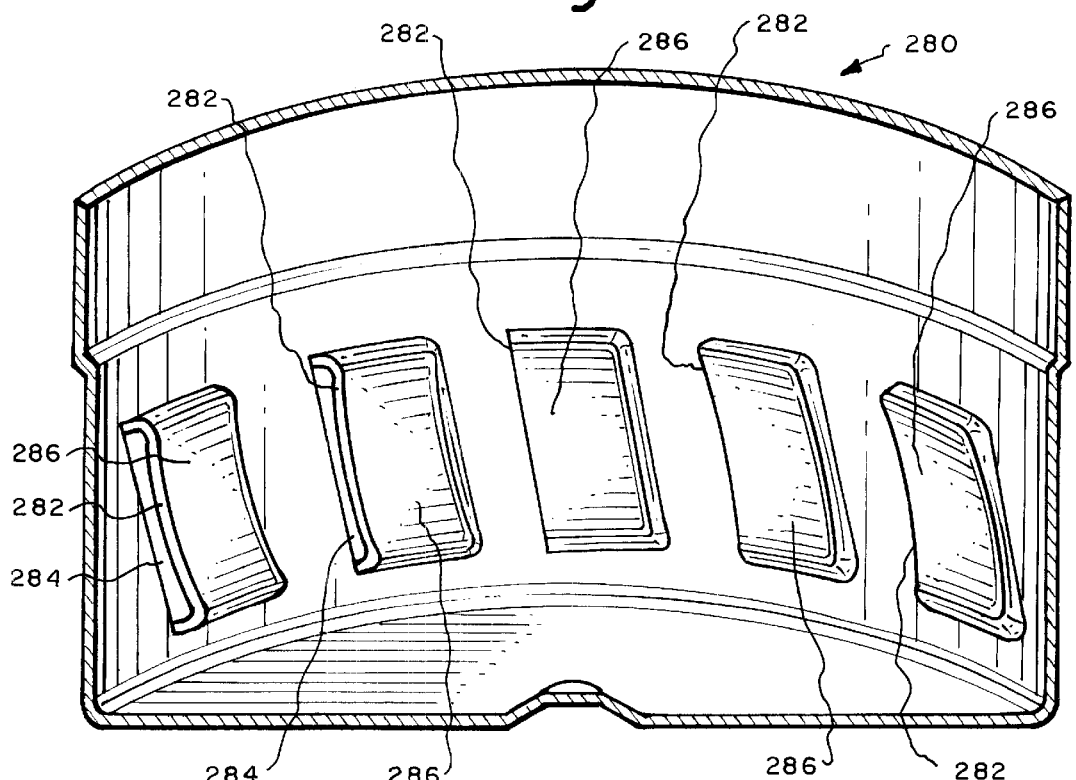
FIG. 11 is a side section view of the alternate roaster agitator of FIG. 10.

FIGS. 10 and 11 show an alternate roaster agitator 280 that may be used with the popcorn maker 10, although the roaster agitator 46 is preferred. The roaster agitator 280, has louvers 282, each of the louvers 282 having substantially rectangular slot 284 and substantially concave roof 286. The arcuate edge 71 of the slot 70 and the arcuate shaped roof 78 of each of the louvers 52 of the roaster agitator 46 result in improved performance over the roaster agitator 280 having the substantially rectangular slot 284 and the substantially concave roof 286.

Figure 12:
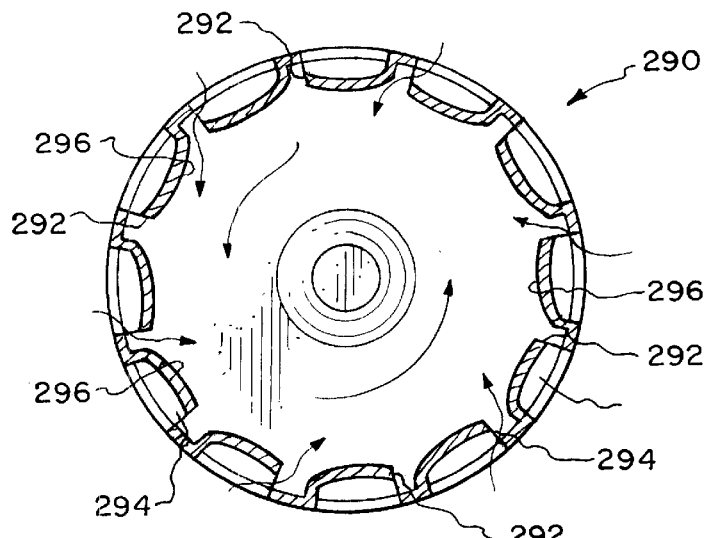
FIG. 12 is a top section view of an alternate roaster agitator.
Figure 13:
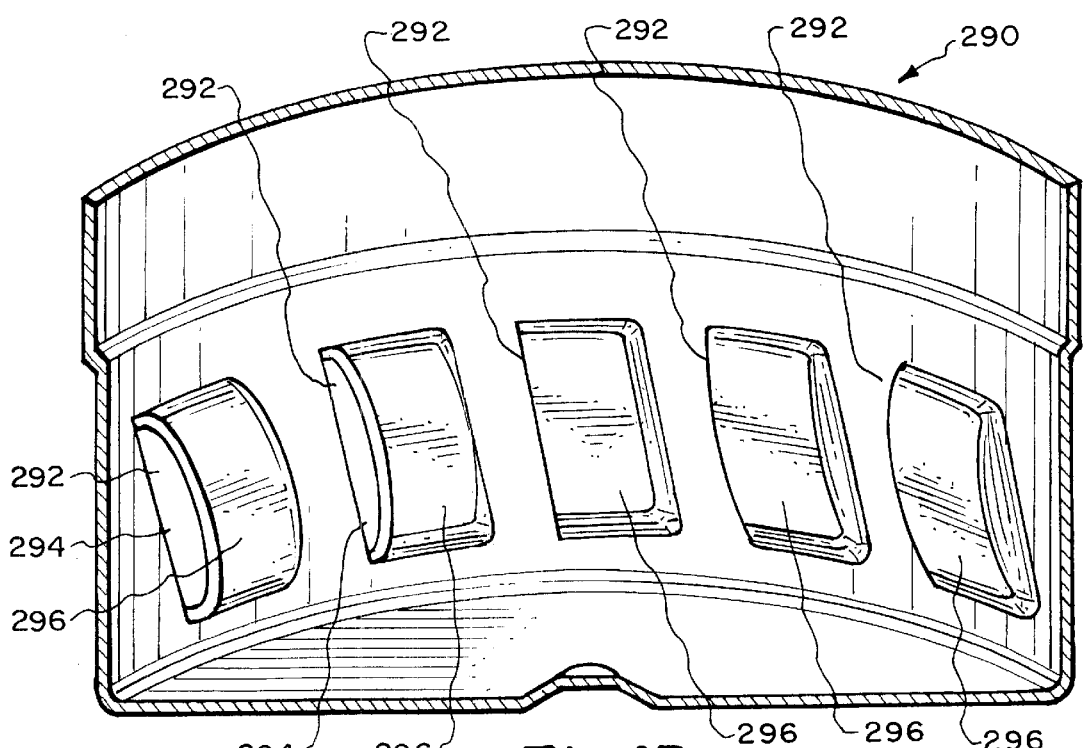
FIG. 13 is a side section view of the alternate roaster agitator of FIG. 12.

FIGS. 12 and 13 show an alternate roaster agitator 290 that may be used with the popcorn maker 10, although the roaster agitator 46 is preferred. The roaster agitator 290, has louvers 292, each of the louvers 292 having substantially arcuate slot 294 and substantially convex roof 296. The arcuate edge 71 of the slot 70 and the arcuate shaped roof 78 of each of the louvers 52 of the roaster agitator 46 result in improved performance over the roaster agitator 290 having the substantially arcuate slot 294 and the substantially convex roof 296.

Although the present invention has been described in considerable detail with reference to certain preferred versions thereof, other versions are possible. Therefore, the spirit and scope of the appended claims should not be limited to the description of the preferred versions contained herein.

What is claimed is:

1. A popcorn maker, comprising:
   a combination heater, roaster, agitator, and convection unit,
   said combination heater, roaster, agitator, and convection unit having a heater, roaster agitator, chimney, and blower;
   said roaster agitator being substantially cup shaped, having a bottom and a substantially cylindrical wall having a plurality of louvers therein,
   said louvers disposed so as to direct heated air downward and towards a central portion of said bottom of said roaster agitator;
   said blower drawing air thereinto said popcorn maker, and impelling
   said air therethrough said heater;
   said heater heating said air and generating heated air;
   said blower impelling said heated air therethrough said louvers and thereinto said roaster agitator;
   said heated and impelled air roasting and agitating corn kernels therein
   said roaster agitator, said roasted and agitated corn kernels being converted to popcorn;
   said heated and impelled air impelling said popcorn thereinto said chimney and expelling said popcorn thereout of said chimney;
   a base; and
   a removably mating cover, said removably mating cover mating with said base;
   said removably mating cover having a chute;
   said combination heater, roaster, agitator, and convection unit mounted therein said base and extending thereinto said removably mating cover;
   said popcorn expelled thereout of said chimney thereinto said removably mating cover and thereout of said chute.

2. The popcorn maker according to claim 1, wherein said combination heater, roaster, agitator, and convection unit has a heat transfer chamber, said heated air additionally being directed thereinto said heat transfer chamber, heat from said heated air therein said heat transfer chamber being transferred therethrough walls of said combination heater, roaster, agitator, and convection unit thereinto said roaster agitator and said chimney of said combination heater, roaster, agitator, and convection unit.

3. The popcorn maker according to claim 1, wherein said chimney has a flared top.

4. The popcorn maker according to claim 1, wherein each said louver has a slot therein.

5. The popcorn maker according to claim 1, wherein each said louver has a slot therein, a roof, and arcuate edge, said slot being defined by said arcuate edge and said wall of said roaster agitator.

6. The popcorn maker according to claim 5, wherein each said louver has an arcuate roof.

7. The popcorn maker according to claim 1, wherein each said louver has a roof and slot therein, said slot being defined by an edge of said roof and said wall of said roaster agitator.

8. The popcorn maker according to claim 7, wherein said roof is arcuate shaped.

9. The popcorn maker according to claim 7, wherein said roof is substantially convex.

10. The popcorn maker according to claim 7, wherein said roof is substantially planar.

11. The popcorn maker according to claim 7, wherein said roof is substantially concave.

12. The popcorn maker according to claim 1, wherein said popcorn maker has a disposal tray mounted thereon said base.

13. The popcorn maker according to claim 1, wherein said popcorn maker has a disposal tray mounted thereon said base, said disposal tray for collecting said popcorn and disposing of said popcorn therethrough said chute.

14. The popcorn maker according to claim 13, wherein said disposal tray slopes downward toward said chute.

15. The popcorn maker according to claim 1, wherein said removably mating cover has a chimney deflector, said chimney deflector adapted to deflect ones of said corn kernels and a portion of said heat expelled therefrom said combination heater, roaster, agitator, and convection unit back into said combination heater, roaster, agitator, and convection unit.

16. The popcorn maker according to claim 1, wherein said removably mating cover has a hole for inserting said corn kernels thereinto said popcorn maker therethrough.

17. The popcorn maker according to claim 1, wherein said combination heater, roaster, agitator, and convection unit, said removably mating cover, and said base are coaxially disposed one with the other.

18. The popcorn maker according to claim 1, wherein said removably mating cover has at least one wall of a transparent material.

19. The popcorn maker according to claim 1, wherein said popcorn maker has indicia on sides of said popcorn maker.

20. The popcorn maker according to claim 1, wherein said base has wheels affixed thereto.

* * * * *